UNITED STATES PATENT OFFICE.

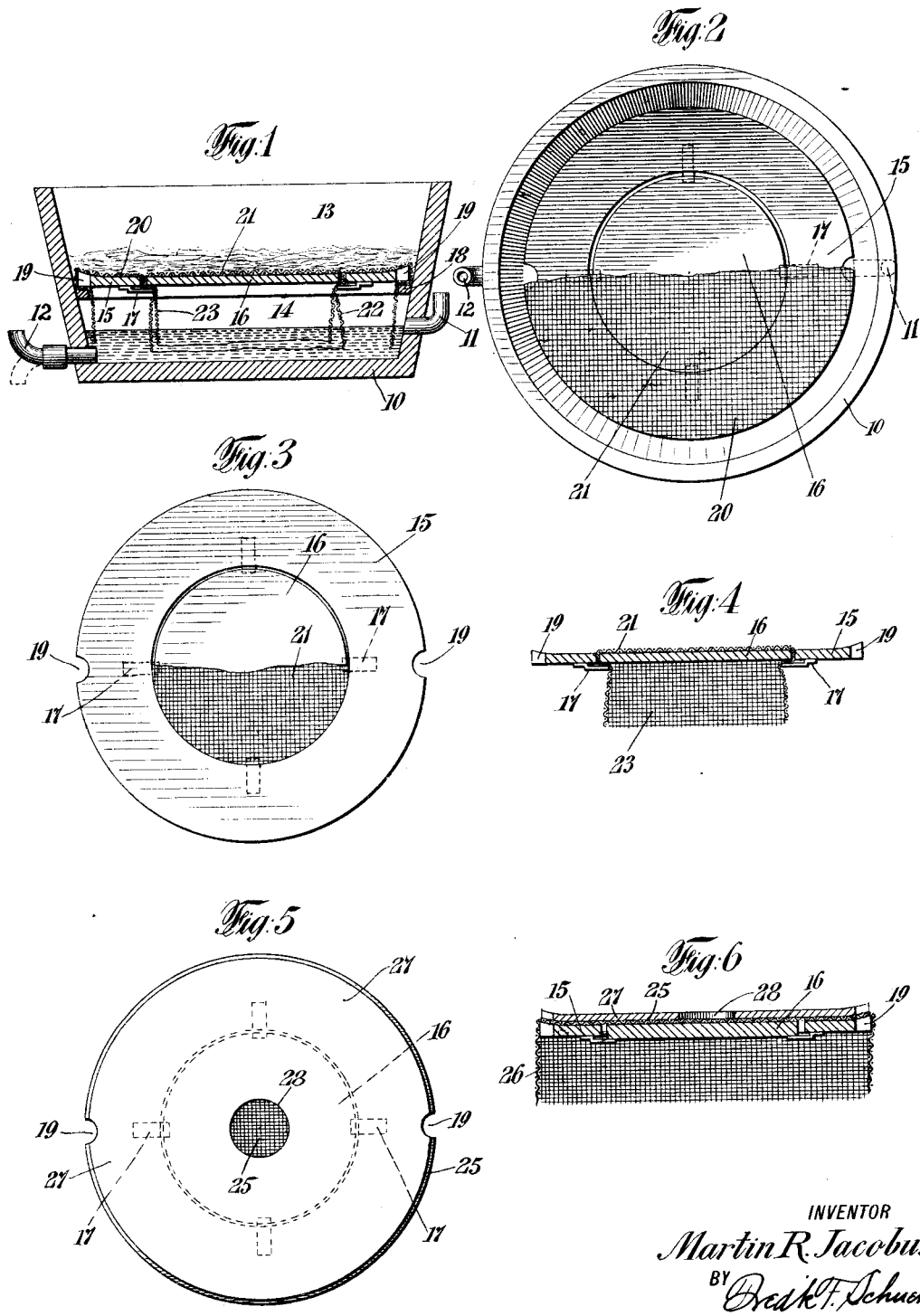

MARTIN R. JACOBUS, OF RIDGEFIELD, NEW JERSEY.

POULTRY-NEST.

1,170,817. Specification of Letters Patent. Patented Feb. 8, 1916.

Application filed May 18, 1915. Serial No. 28,810.

*To all whom it may concern:*

Be it known that I, MARTIN R. JACOBUS, a citizen of the United States, and a resident of Ridgefield, in the county of Bergen and State of New Jersey, have invented certain new and useful Improvements in Poultry-Nests, of which the following is a specification.

The invention relates to a poultry nest suitable for hatching purposes or for use merely as a sanitary laying nest.

In the former connection, the invention has for its object to provide means whereby the necessary moisture for properly hatching the eggs may be supplied thereto and in any quantity desired.

A further object of the invention is to obviate the troublesome and undesirable, as well as ineffectual, use of damp earth in the nest under the eggs and similar expedients resorted to for affording the moisture. A suitable insecticide, also, may be used in connection therewith to destroy chicken lice and other vermin.

Another object of the invention is to so construct the nest that the parts thereof may be readily removable for cleaning and to provide, also, a simple sanitary and inexpensive nest convenient for shipping.

In the accompanying drawings which illustrate the invention—Figure 1 is a vertical section through the improved nest. Fig. 2 is a plan thereof. Fig. 3 is a plan and Fig. 4 a fragmentary section illustrating a modification; and Figs. 5 and 6 are similar views illustrating a further modification.

Similar characters of reference designate corresponding parts throughout the several views.

Referring to Figs. 1 and 2 of the drawings, 10 designates a suitable container or receptacle and near the bottom of which is provided an inlet tube 11 and an overflow or drain tube 12, the latter being located substantially at the bottom of the receptacle and capable of being turned upwardly or downwardly, as indicated, to conveniently determine the level of the liquid therein or to effect its removal therefrom. The said receptacle 10 is designed to be divided into an upper or nest compartment 13 and a lower or liquid compartment 14 by means of a partition which is herein shown as composed of two concentric disks 15 and 16, the former being annular and the latter adapted to be fitted therein and resting upon suitable lugs or supports 17 attached to the said annular disk. The disk 15, moreover, is designed to fit within the receptacle 10 and its position may be further insured by means of supporting lugs, ring or shoulder 18 held to the inner wall of said receptacle. To conveniently remove the same, finger holes 19 may be provided therein to assist in the lifting of the same. The upper surface of the two disks, and which is preferably concave, is designed to support the nest material as straw or other soft material and upon which the eggs and hen, or only the latter, are placed. The lower chamber 14 is designed to contain water, or water and insecticide, the level of same therein being determined in any suitable manner as by adjusting the position of the tube 12, as hereinbefore set forth.

It is well known that in the hatching of eggs, it is highly desirable that the same be supplied with sufficient moisture and in varying amounts during the different stages of the hatch. Various expedients have been resorted to for this purpose, the most general of which consisted in the use of damp earth or sod beneath the nest. This, however, is not entirely satisfactory as it results in a cumbersome and heavy nest as well as being unsanitary and permitting of no positive control of the degree of moisture. With the present construction, a liquid absorbent element, such as a linen cloth 20 suitably cut, is designed to straddle the disk 15, Figs. 1 and 2, and a cloth 21, the disk 16, the said cloths having downwardly projecting portions 22 and 23 respectively which are designed to dip into the liquid of the lower portion 14. Through capillary attraction, the liquid is absorbed by the said cloths and drawn upwardly to the nest portion 13, thus affording a constant supply of moisture thereto. If it be desired to vary the degree of moisture, the cloth 20 for example may be omitted, as shown in Figs. 3 and 4 and only the cloth 21 covering the central disk will be employed. Or, for example, a single cloth 25 straddling both of the disks and having downwardly extending portions 26 to dip into the liquid may be employed. Of course, the number of disks is not limited and various other combinations of disks and cloths will suggest themselves. Moreover, a further control of the moisture supply is possible by placing over the partition or disk members 15 and 16 a non-absorbent or only partly absorbent diaphragm or disk 27, Figs. 5 and 6, of the desired size and inserted between the said cloths and the material composing the nest and provided when necessary with the proper size opening 28. Or, the moisture supplying cloth itself may be variously cut and arranged over the partition to afford the desired condition.

I claim:—

1. A poultry nest, comprising: a receptacle, a partition dividing said receptacle into a lower liquid compartment and an upper nest compartment, and a liquid absorbent element held by said partition and dipping into the liquid of the liquid compartment.

2. A poultry nest, comprising: a receptacle, a partition consisting of a plurality of concentric disks and dividing said reseptacle into a lower liquid compartment and an upper nest compartment, and a liquid absorbent element held by said partition and dipping into the liquid of the liquid compartment.

3. A poultry nest, comprising: a receptacle, a partition consisting of an outer annular member and an inner disk supported thereby and an absorbent element over said inner disk, held between the same and the annular member and having portions dipping into the liquid of said liquid compartment.

4. A poultry nest, comprising: a receptacle, a partition consisting of an outer annular member and an inner disk supported thereby, an absorbent element over said inner disk held between the same and the annular member and having portions dipping into the liquid of said liquid compartment, and an absorbent element over said annular member and dipping into the liquid of said liquid compartment.

5. A poultry nest, comprising: a receptacle, a partition dividing said receptacle into a lower liquid compartment and an upper nest compartment, a liquid absorbent element held by said partition and dipping into the liquid of the liquid compartment, and a disk resting upon said partition.

6. A poultry nest, comprising: a receptacle, a partition dividing said receptacle into a lower liquid compartment and an upper nest compartment, a liquid absorbent element held by said partition and dipping into the liquid of the liquid compartment, and a non-absorbent disk resting upon said partition.

7. A poultry nest, comprising: a receptacle, a partition dividing said receptacle into a lower liquid compartment and an upper nest compartment, a liquid absorbent element held by said partition and dipping into the liquid of the liquid compartment, and a non-absorbent disk resting upon said partition and provided with a suitable opening therethrough.

Signed at New York, in the county of New York and State of New York, this 14th day of May, A. D. 1915.

MARTIN R. JACOBUS.

Copies of this patent may be obtained for five cents each, by addressing the "Commissioner of Patents, Washington, D. C."